April 28, 1942.  A. F. WEISE  2,281,015
PAN LIFTER
Filed April 8, 1941
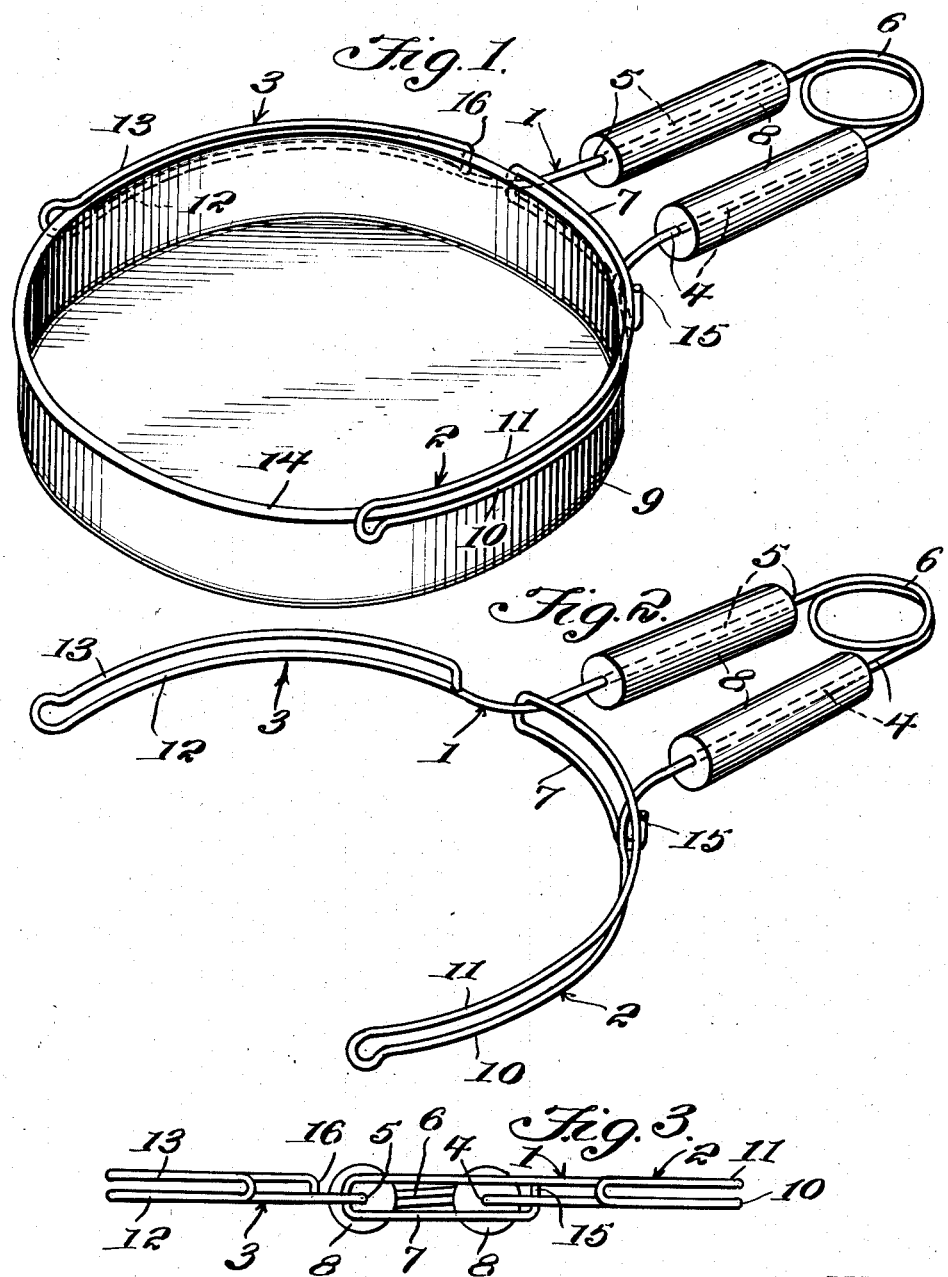
INVENTOR.
Albert F. Weise,
BY Patented Apr. 28, 1942

2,281,015

UNITED STATES PATENT OFFICE 2,281,015

PAN LIFTER

Albert F. Weise, West View, Pa.

Application April 8, 1941, Serial No. 387,529

1 Claim. (Cl. 294—33)

This invention relates to improvements in pan lifters, such as for lifting cake, pie and other like pans or culinary utensils, and one object of the invention is to provide a lifter of this character by means of which a pan may be securely grasped at its upper edge or lip portion, and without the necessity of engaging the pan beneath its bottom, so as to enable a compact form of lifter to be produced and so as to avoid liability of the lifter becoming caught in an oven rack in inserting a pan into or removing it from an oven.

A further object of the invention is to provide a pan lifter which is adapted to grip any sized pan, within reasonable limits, or pans with sloping or straight sides regardless of the depth of the pan.

A still further object of the invention is to provide a pan lifter by means of which a pan may be lifted from or placed in a casserole or similar receptacle.

A still further object of the invention is to provide a pan lifter which is simple of construction, reliable and effective in use and inexpensive of production, and which may be made wholly or practically wholly from a single piece of spring wire of suitable gage.

The invention consists of the features of construction, combination and arrangement of parts, hereinafter fully described and claimed, reference being had to the accompanying drawing, in which:

Fig. 1 is a perspective view of a pan lifter embodying my invention showing it as used for lifting a pan.

Fig. 2 is a similar view of the lifter per se.

Fig. 3 is a front end elevation of the lifter.

In carrying my invention into practice I provide a pan lifter 1 comprising a pair of opposed partly circular jaws 2 and 3, a pair of handle rods or members 4 and 5 extending from the respective jaws, a coiled spring 6 connecting said handle rods or members at their rear ends, and a guide loop 7 extending transversely between the forward ends of the handle members or rods at their points of juncture with the jaws and in which the handle members are slidable toward and from each other. Grip members 8, of cross-sectionally circular or other suitable form and made of wood or other non-conducting material, may be provided on the handle rods or members for an obvious purpose. The spring 6 holds the handle members and jaws normally spread apart to adapt the jaws to receive between them a pan 9 to be lifted. The jaws are normally spread a distance to receive and engage a pan of comparatively large size or diameter and may be brought into clamping engagement with the pan by inward pressure of the hand of the operator grasping the handle members, whereby the handle members will be moved toward each other against the resistance of the spring 6 and the jaws brought to bear against the pan. Upon relaxing the pressure on the handle members the spring 6 will react to move the handle members apart and spread the jaws to release the pan. In these movements toward and from each other the handle members slide in the guide loop 7, thus keeping the jaws in proper relative position and guiding them accurately in their movements.

In accordance with my invention the jaws 2 and 3 are made of looped formation, the jaw 2 comprising limbs 10 and 11 and the jaw 3 limbs 12 and 13, the limbs of each jaw being closely spaced so that each jaw is provided with an elongated narrow slot and is of comparatively shallow depth. The spaces between the limbs of the jaws are thus adapted to receive the outwardly extending flange or lip 14 of a pan, such as the pan 9, adapting the pan to be held in firm locking connection with the jaws. By this means the lifter is rendered applicable to a pan having either straight or sloping sides, and of any size within its gripping limits, regardless of the depth of the pan. By this construction of the lifter, also, the necessity of constructing the jaws or any portion of the lifter to engage the bottom of the pan is avoided and the danger of the lifter being caught in an oven rack, when applying or removing a pan, eliminated. Furthermore, this construction of the lifter adapts it to be used to place a pan in or remove it from a casserole or other similar receptacle, as will be readily understood.

Also in accordance with my invention the lifter, with the exception of the grip members 8, is preferably formed of a single piece of spring wire of suitable gage. The manner of forming the lifter of a single piece of wire may vary so far as the sequence of operations of bending the portions of the wire is concerned. Conveniently, however, starting from one end 15 of the wire, the wire may be bent to form the loop 7, thence continued to form the jaw 2, thence continued to form the handle rod 4, spring 6 and handle rod 5, and finally bent to form the jaw 3, at the inward limit of the limb 13 of which the other end of the wire may terminate, as shown at 16. This mode of construction provides a strong and durable construction of lifter, which at the same time is light in weight and may be handled with ease and facility. It will, of course, be understood that in the process of formation the hand grips 8 will be applied to the handle rods 4 and 5, to which they may be loosely mounted or to which they may be firmly secured as desired.

From the foregoing description, taken in connection with the drawing, the construction and mode of use of my improved pan lifter will be readily understood and its advantages appreciated without a further and extended description. While the structure shown is preferred, it is to be understood, of course, that changes in the form, proportions and relative arrangement of the parts may be made within the scope of the appended claim, without departing from the spirit or sacrificing any of the advantages of the invention.

What I claim is:

A pan lifter formed from a single piece of wire bent at one end to form a transverse guide loop closed at one end by a return bend integrally connecting the arms of the loop and closed at its opposite end by a bent end of one of the arms forming one of the extremities of the wire, the wire thence being bent to form a looped jaw, thence bent to form a handle portion, a coil spring and a second handle portion connected by the spring with the first-named handle portion, said handle portions being extended through and movable relatively to each other in the guide loop, and then continued beyond the second-named handle portion and bent to form a second looped jaw for cooperation with the first-named jaw, one end of the loop of the second-named jaw being closed by a bent portion constituting the other extremity of the wire.

ALBERT F. WEISE.